US010564737B2

(12) United States Patent
Yeh et al.

(10) Patent No.: US 10,564,737 B2
(45) Date of Patent: Feb. 18, 2020

(54) CAPACITIVE STYLUS WITH ERASER

(71) Applicant: WALTOP INTERNATIONAL CORPORATION, Hsinchu (TW)

(72) Inventors: Chia-Jui Yeh, Taipei (TW); Yi-Chih Chang, Hsinchu (TW)

(73) Assignee: Waltop International Corporation, Hsinchu (TW)

( * ) Notice: Subject to any disclaimer, the term of this patent is extended or adjusted under 35 U.S.C. 154(b) by 33 days.

(21) Appl. No.: 16/053,666

(22) Filed: Aug. 2, 2018

(65) Prior Publication Data

US 2019/0056807 A1   Feb. 21, 2019

(30) Foreign Application Priority Data

Aug. 18, 2017  (TW) .............................. 106128114 A

(51) Int. Cl.
*G06F 3/0354* (2013.01)
*G06F 3/038* (2013.01)

(52) U.S. Cl.
CPC ........ *G06F 3/03545* (2013.01); *G06F 3/0383* (2013.01)

(58) Field of Classification Search
CPC .............................. G06F 3/03545; G06F 3/046
USPC ....................................................... 345/179
See application file for complete search history.

(56) References Cited

U.S. PATENT DOCUMENTS

| 4,670,751 | A  | * | 6/1987  | Enokido ................. G06F 3/038 178/19.01 |
| 8,450,972 | B2 |   | 5/2013  | Cacioppo et al. |
| 9,639,182 | B1 |   | 5/2017  | Tang et al. |
| 2014/0267147 | A1 |   | 9/2014  | Buelow et al. |
| 2016/0364023 | A1 | * | 12/2016 | Bathiche ............. G06F 3/03545 |
| 2017/0108954 | A1 | * | 4/2017  | Tang .................. G06F 3/0383 |
| 2019/0056806 | A1 | * | 2/2019  | Yeh ....................... G06F 3/0383 |

FOREIGN PATENT DOCUMENTS

| CN | 205103786 U | * | 3/2016 | ........ G06F 3/03545 |
| TW | 201441871 A |   | 11/2014 | |
| TW | 201528070 A |   | 7/2015 | |
| TW | 201704942 A |   | 2/2017 | |

OTHER PUBLICATIONS

Office Action dated Jul. 6, 2018 in corresponding Taiwan Patent Application No. 106128114.

* cited by examiner

*Primary Examiner* — Yuzhen Shen

(74) *Attorney, Agent, or Firm* — Donald E. Stout; Stout, Uxa & Buyan, LLP

(57) ABSTRACT

This invention discloses a capacitive stylus including a pen housing and an eraser for being applied to a touch device. The pen housing includes a tip for emitting an input signal, and the eraser can emit an erasing signal to the touch device. The intensity or erasing range of the erasing signal is determined by the pressure that the eraser exerted on the touch device. In addition, the eraser can trigger a signal to instruct the touch device performing an application.

10 Claims, 6 Drawing Sheets

CAPACITIVE STYLUS WITH ERASER

CROSS-REFERENCE TO RELATED APPLICATIONS

The entire contents of Taiwan Patent Application No. 106128114, filed on Aug. 18, 2017, from which this application claims priority, are herein expressly incorporated herein by reference.

BACKGROUND OF THE INVENTION

1. Field of the Invention

The present invention relates to a handwriting input system, and more particularly relates to a capacitive stylus having an eraser.

2. Description of Related Art

A digitizer system typically includes a tablet and a stylus. The user places the tip of the stylus on or near a sensing surface of the tablet, and the tablet tracks the position change of the tip on the sensing surface and interprets it as an instruction or forms a stroke.

A capacitive input pen with an erasing function is more convenient for the consumer to use. For example, the input content can be corrected by erasing.

SUMMARY OF THE INVENTION

In one general aspect, the present invention relates to a capacitive stylus having an eraser.

According to an aspect of this invention, a capacitive stylus is provided to be used on a touch device. The capacitive stylus comprises a pen housing and an eraser. The pen housing comprises a tip disposed at a front of the pen housing for emitting an input signal. The eraser is disposed at a rear of the pen housing for emitting an erasing signal, and comprises a tail cap, an emission electrode, a circuit board, a connecting member, a trigger, a metal contact member, a first spring, and a second spring. The emission electrode is disposed within the tail cap. The circuit board is electrically connected with the emission electrode. The connecting member is made of insulating material and is in contact with the emission electrode. The trigger is made of insulating material and is inserted into a recess of the connecting member. The metal contact member has a cylinder and a through hole through which the trigger passes. The first spring is sleeved on the cylinder of the metal contact member and electrically connects to the circuit board. The second spring is disposed in front of the first spring and electrically connects to the circuit board. An erasing signal is generated by interactions between the metal contact member, the first spring, and the second spring caused by compression of the tail cap.

In one embodiment, the emission electrode is spring-shaped and is sleeved on the connecting member, and the emission electrode comprises an end to electrically connect with the circuit board and provides a force to rebound the tail cap.

In one embodiment, the eraser further comprises a shielding wire and a shielding ring made of metal, the shielding ring encompasses a portion of the emission electrode, and the shielding wire includes a first end electrically connected with a ground of the circuit board and a second end connected with the shielding ring.

In one embodiment, the capacitive stylus further comprises a tact switch disposed in front of the second spring, wherein the tact switch connects with a flexible printed circuit board, and a further compression of the tail cap will result in the trigger in contact with the tact switch.

In one embodiment, the flexible printed circuit board electrically connects with a Bluetooth module, and when the tact switch is touched, the Bluetooth module emits a signal and the touch device receives the signal and executes an application.

In one embodiment, the capacitive stylus further comprises a memory to store with a firmware for performing a program, wherein the program determines that the signal of the tact switch is ignored when the tail cap of the capacitive stylus approaches or contacts a screen of the touch device.

In one embodiment, an end of the second spring electrically connects with a ground of the circuit board.

In one embodiment, the pen housing further comprises a control circuit and a plurality of contacts electrically connecting with the control circuit, and the eraser further comprises a plurality of elastic shrapnels, and when the eraser is assembled with the pen housing, the plurality of elastic shrapnels are respectively in contact with the plurality of contacts.

In one embodiment, the pen housing further comprises a battery or an electrode, and the front of the eraser comprises a contact electrode, and when the eraser is assembled with the pen housing, the contact electrode is in contact with the battery or the electrode.

DETAILED DESCRIPTION OF THE PREFERRED EMBODIMENT

Figure 1:
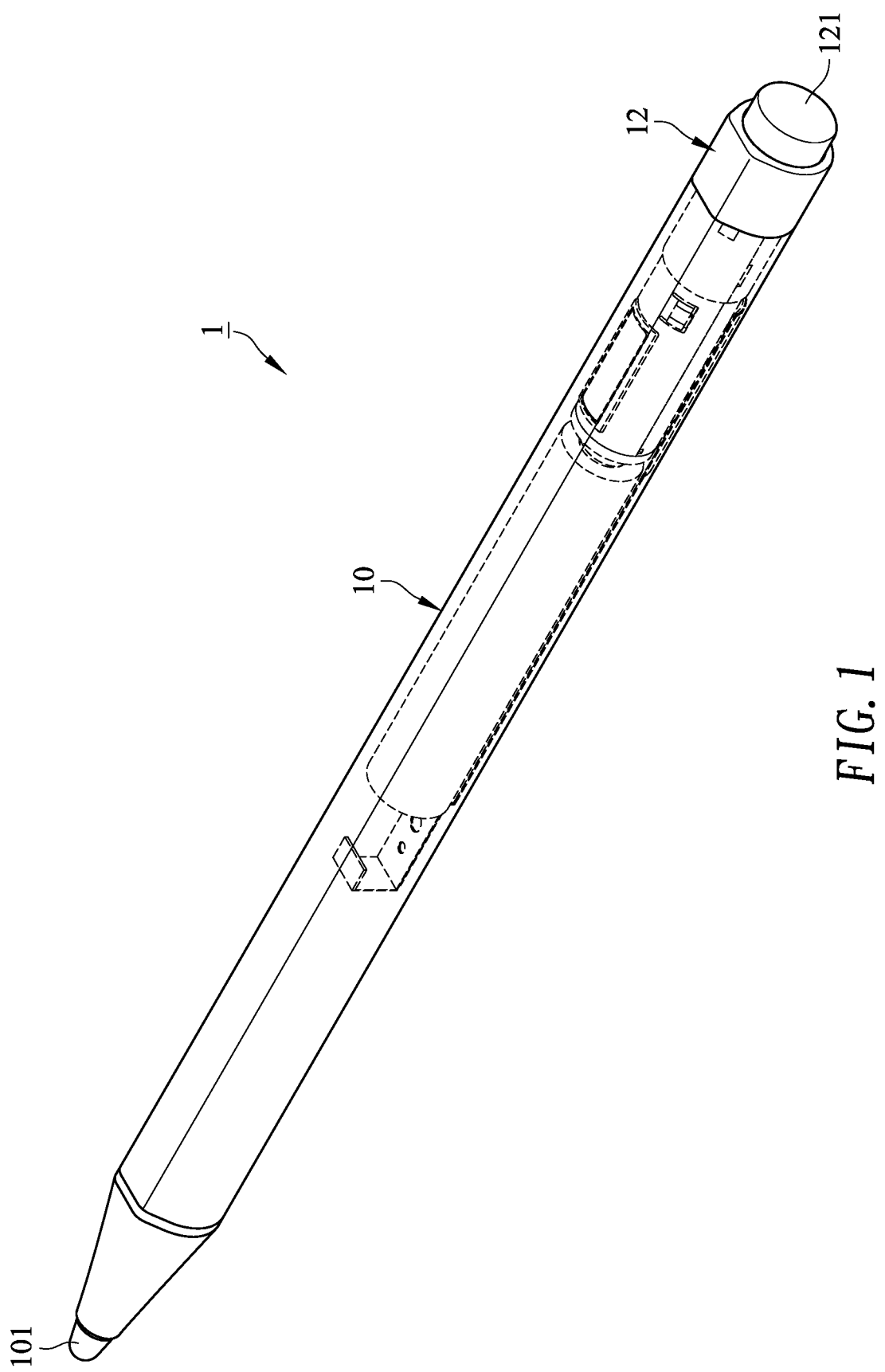
FIG. 1 is a perspective view showing a capacitive stylus with a detachable eraser in accordance with a preferred embodiment of the present invention.

Embodiments of the invention are now described and illustrated in the accompanying drawings, instances of which are to be interpreted to be to scale in some implementations while in other implementations, for each instance, not. In certain aspects, use of like or the same reference designators in the drawings and description refers to the same, similar or analogous components and/or elements, while according to other implementations the same use should not. According to certain implementations, use of directional terms, such as, top, bottom, left, right, up, down, over, above, below, beneath, rear, front, clockwise, and counterclockwise, are to be construed literally, while in other implementations the same use should not. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components.

Figure 2:
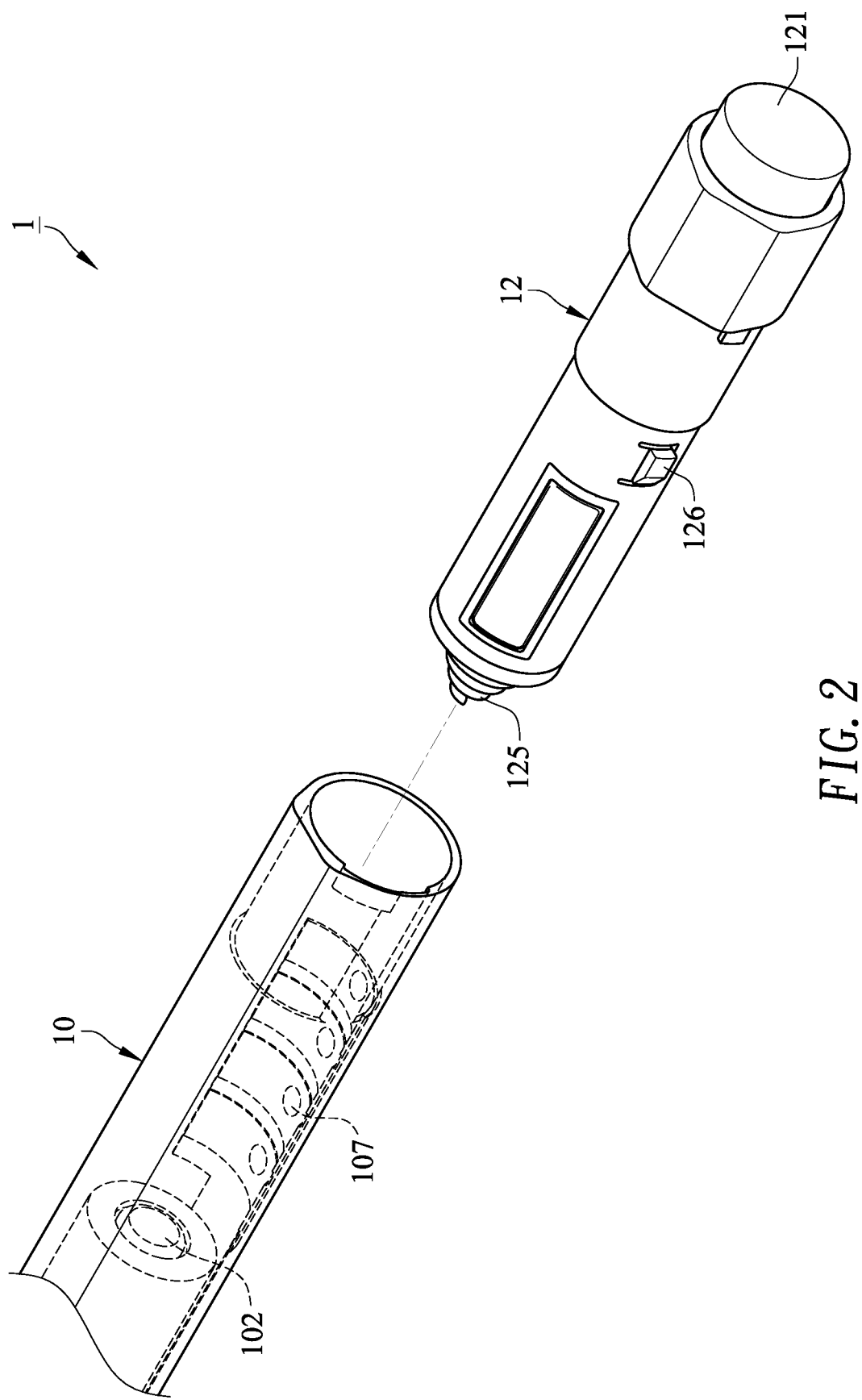
FIG. 2 is a partially perspective view showing the capacitive stylus with the detachable eraser in accordance with the preferred embodiment of the present invention.

FIGS. 1 and 2 are perspective view and partial perspective view, showing a capacitive stylus 1 with an eraser 12 in accordance with a preferred embodiment of the present invention. In this embodiment, the capacitive stylus 1 is applied to a touch device (not shown) such as a mobile touch device including a mobile phone or a tablet computer. The touch device may include a touch screen or in-cell sensing elements that can sense the touch positions touched by the user. In one embodiment, the touch screen is a capacitive touch screen, but is not limited thereto.

Referring to FIGS. 1 and 2, the capacitive stylus 1 includes a pen housing 10 and an eraser 12. Preferably, the eraser 12 is detachable. The pen housing 10 itself can be used as a general capacitive input pen. The front end of the pen housing 10 has a tip 101 through which the user can write on the screen of the touch device. A control circuit (not shown) is disposed within the pen housing 10, and the control circuit transmits signals through the tip 101 or other electrode elements. The touch device receives the signals and performs functions corresponding to the signals.

Referring to FIG. 1 and FIG. 2, the pen housing 10 includes a battery 102 (or an electrode 102) electrically connected to the control circuit of the capacitive stylus 1. The front of the eraser 12 includes a contact electrode 125. When the pen housing 10 is combined with the eraser 12, the contact electrode 125 is in contact with the battery 102 (or the electrode 102), causing that the eraser 12 electrically connects the battery 102 and/or the control circuit of the capacitive stylus 1.

Figure 3:
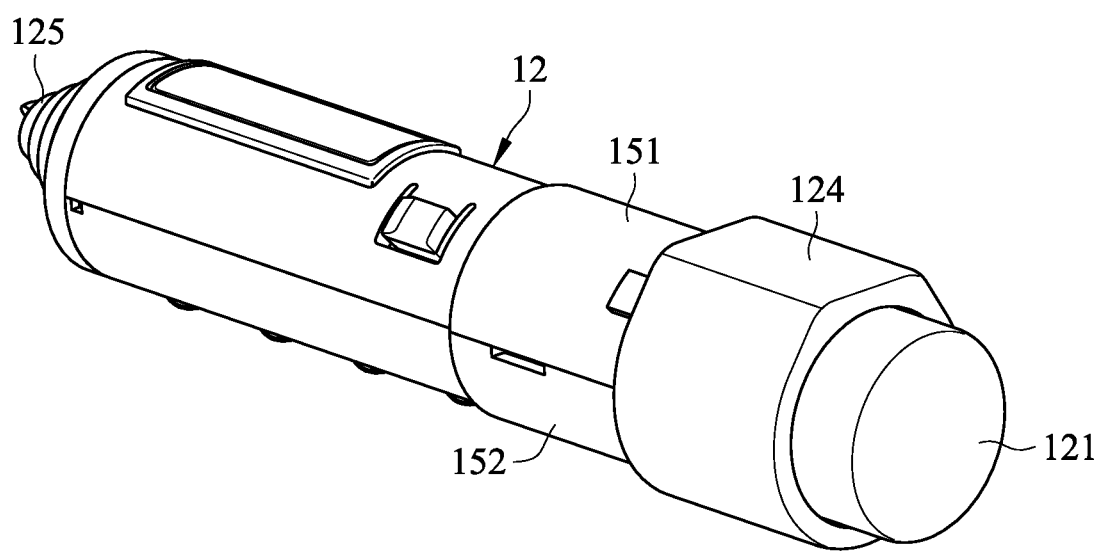
FIG. 3 is a perspective view showing the eraser of the capacitive stylus in accordance with the preferred embodiment of the present invention.
Figure 4:
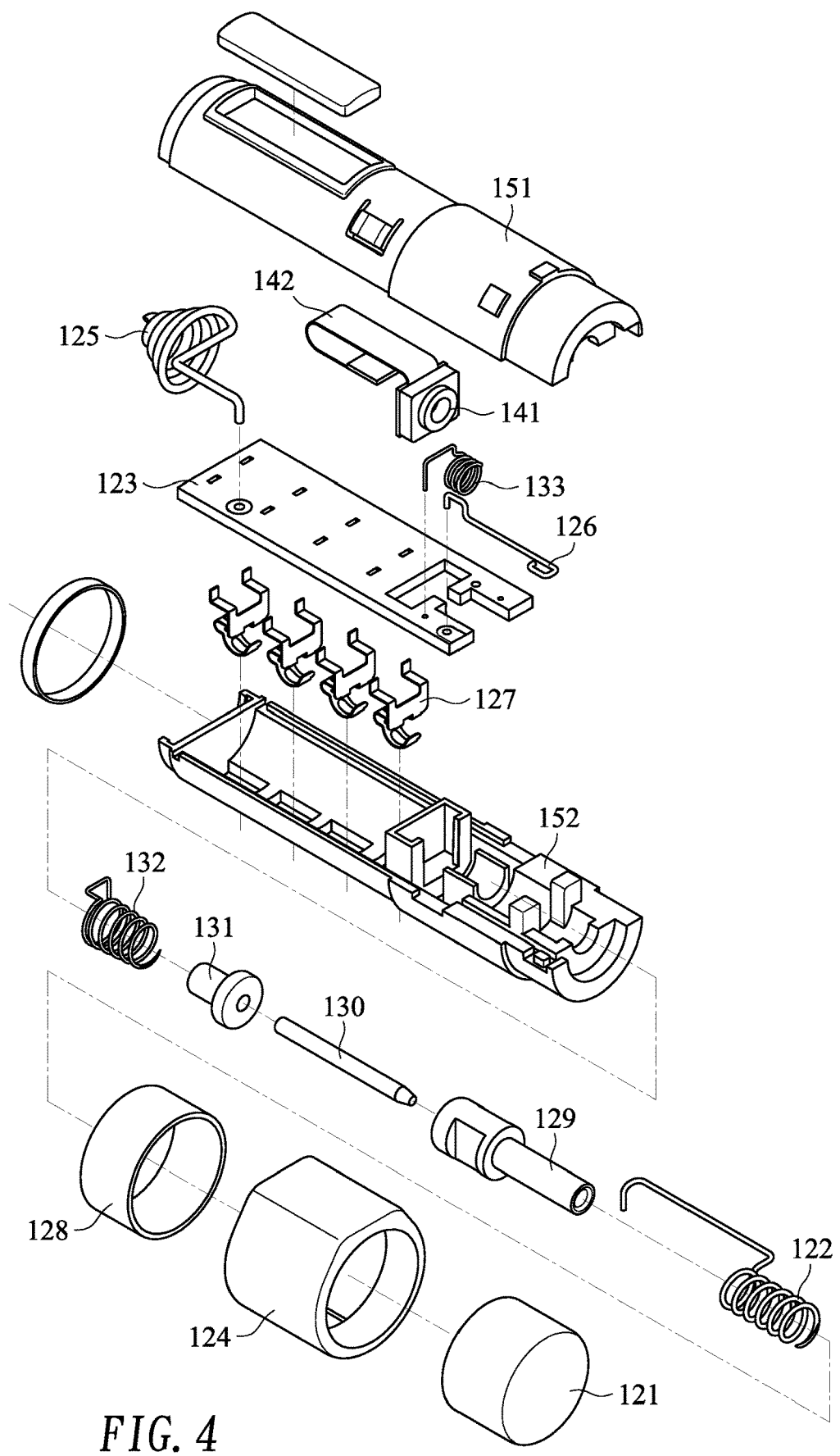
FIG. 4 is an exploded view showing the eraser of the capacitive stylus with the detachable eraser in accordance with the preferred embodiment of the present invention.
Figure 5:
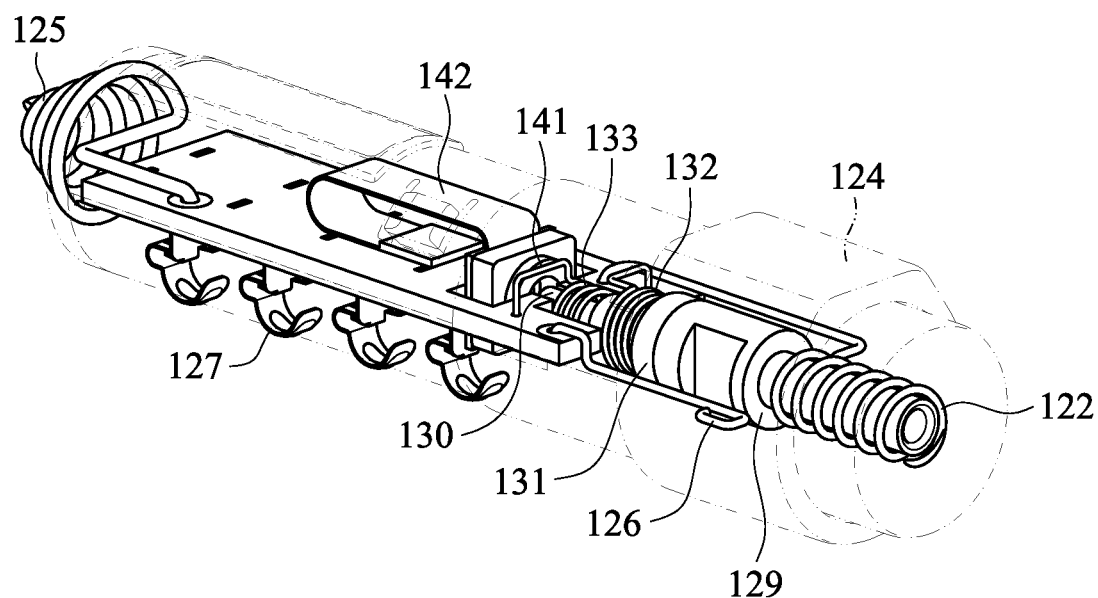
FIGS. 5 and 6 are perspective views of different viewing angles showing the eraser of the capacitive stylus in accordance with the preferred embodiment of the present invention.
Figure 6:
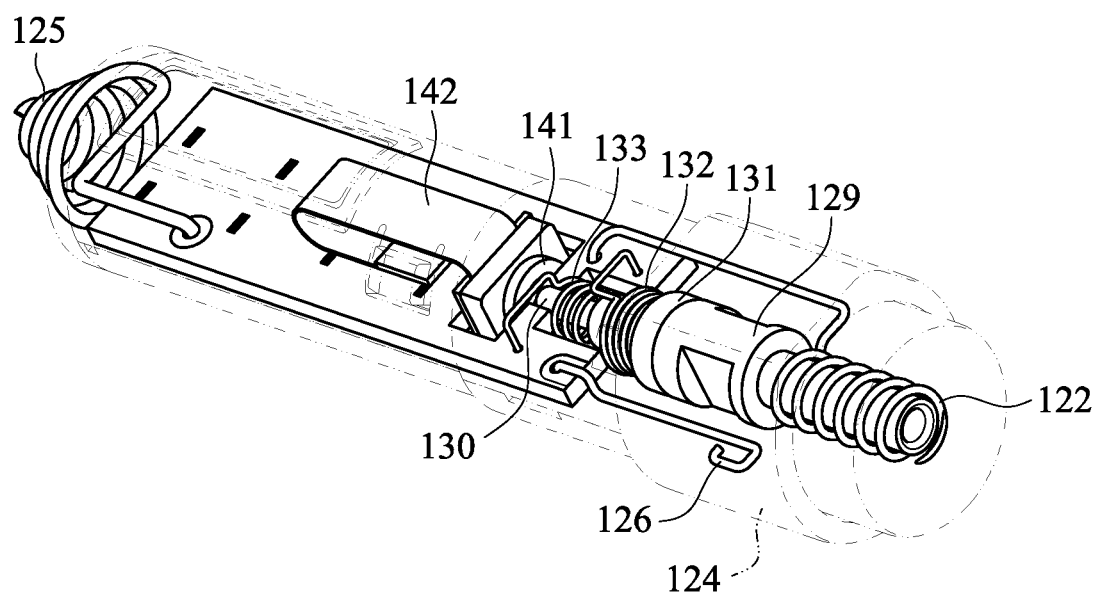

FIG. 3 is a perspective view, FIG. 4 is an exploded view, and FIGS. 5 and 6 are perspective views of different viewing angles showing the eraser 12 of the capacitive stylus 1 in accordance with the preferred embodiment of the present invention. As shown in FIGS. 3-6, the eraser 12 mainly includes a tail cap 121, an emission electrode 122, a circuit board 123, a connecting member 129, a trigger 130, a metal contact member 131, a first spring 132, and a second spring 133. As shown in FIG. 3, the housing of eraser 12 is composed of an upper housing 151 and a lower housing 152, and the tail cap 121 is exposed at one end of the housing. Preferably, the upper housing 151, the lower housing 152, and the tail cap 121 are made of a plastic.

As shown in FIGS. 3-6, the connecting member 129 is preferably composed of two cylinders, a large cylinder and a small cylinder. The appearance of emission electrode 122 is like a spring, and one end thereof is straightened and extended to electrically connect the circuit board 123. The spring-like emission electrode 122 is sleeved on the small cylinder of the connecting member 129 and is located within the tail cap 121. When the tail cap 121 of the eraser 12 is pressed (for example, the user touches the screen of the touch device with the tail cap 121 of the eraser 12), the circuit board 123 transmits an erasing signal through the emission electrode 122 and the touch device receives the erasing signal and performs an erasing function. More details will be described later. Due to the spring configuration, the emission electrode 122 provides an elastic force to rebound the compressed tail cap 121 to its initial position.

As shown in FIGS. 3-6, both the connecting member 129 and the trigger 130 are preferably made of an insulating material such as plastic. The rear end of the trigger 130 is inserted into a recess at the front end of the connecting member 129; the front end of the trigger 130 penetrates a through hole of the metal contact member 131. Preferably, the metal contact member 131 is composed of a disc and a cylinder, wherein the disc is located behind the cylinder, and the diameter of the disc is larger than the diameter of the cylinder. The aforementioned through hole is located at the center of the disc and the cylinder allowing for the trigger 130 to penetrate. The first spring 132 is made of metal and sleeved on the cylinder of the metal contact member 131, and has one end electrically connected to the circuit board 123. The second spring 133 is made of metal and is fixed to the circuit board 123. In an embodiment, the second spring 133 is electrically connected to a ground (GND) of the circuit board 123.

As shown in FIGS. 3-6, when the tail cap 121 is not pressed, the first spring 132 is not in contact with the second spring 133, which is arranged in front of the first spring 132. When the user points to the screen of touch device (such as a tablet) with the tail end of the capacitive stylus 1, the touch device receives a buoy signal generated by the emission electrode 122, thereby defining a position to be erased. When the tail cap 121 is pressed, the large cylinder of the connecting member 129 pushes the disc of the metal contact member 131, causing the metal contact member 131 to push the first spring 132, so that the first spring 132 is in contact with the second spring 133 via the metal contact member 131, resulting in a pressure sensitive signal being generated by the circuit board 123. The pressure sensitive signal is used to measure the pressure of the tail cap 121 being pressed, and the greater the strength of the tail cap 121 being pressed, the greater the strength of the pressure sensitive signal. The pressure sensitive signal can be converted into an erasing signal and transmitted to the touch device via the emission electrode 122. The greater the strength of the tail cap 121 being pressed, the larger the range being erased by the erasing signal.

As shown in FIGS. 3-6, the eraser 12 can also have a shielding wire 126 and a shielding ring 128 (FIG. 4), and both of them are made of metal. One end of the shielding wire 126 is electrically connected to the ground of the circuit board 123, and the other end is connected to the shielding ring 128. When assembled, the shielding ring 128 is located within the plastic sleeve 124. The shielding ring 128 covers portion of the emission electrode 122 and is not shown in FIGS. 5 and 6 for clarity. The shielding ring 128 can isolate the noises and/or cause the erasing signal emitted by the emission electrode 122 to be directional.

As shown in FIGS. 3-6, in the preferred embodiment of the present invention, the capacitive stylus 1 may further include a tact switch 141 that is located in front of the second spring 133 but is not in contact with the second spring 133. The tact switch 141 can be electrically connected to a flexible printed circuit board 142. The flexible printed circuit board 142 can be electrically connected to a Bluetooth module (not shown) of the control circuit. When the user further presses the tail cap 121 so that the trigger 130 that has passed through the metal contact member 131 is further advanced to press the tact switch 141, the control circuit transmits an instruction to the touch device (such as a tablet) through the Bluetooth module, and the touch device performs a function corresponding to the instruction, e.g., executing an application, such as Microsoft Paint or Microsoft Notepad.

In an embodiment, a memory of the capacitive stylus is stored with a firmware for performing a program. The program determines that the signal of the tact switch 141 is ignored when the tail cap 121 of the capacitive stylus 1 approaches or contacts the screen of the touch device. When the user performs the erasing function with the tail cap 121, the program can prevent the function or application from being executed due to the tact switch 141 being touched by excessive force.

As shown in FIG. 2, FIG. 4, FIG. 5, and FIG. 6, in the preferred embodiment, the circuit board of the eraser 12 further includes a plurality of elastic shrapnels 127, for example, four elastic shrapnels 127. The inner wall of the pen housing 10 has a corresponding number of contacts 107, for example, four contacts 107. When the pen housing 10 and the eraser 12 are assembled, each terminal of the elastic shrapnels 127 just contacts one corresponding contact 107. The contact 107 can be electrically connected to the control circuit (not shown) of the pen housing 10.

According to the capacitive stylus 1 provided by the embodiments of the invention, the user can conveniently erase the input content, and the range of the erase can be determined by the force exerted to the tail cap 121. In addition, if the user continues to press the tail cap 121, the tablet can also perform a corresponding function, such as executing an application.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A capacitive stylus used on a touch device, comprising:
a pen housing comprising a tip disposed at a front of the pen housing for emitting an input signal;
an eraser being disposed at a rear of the pen housing for emitting an erasing signal, the eraser comprising:
a tail cap;
an emission electrode being disposed within the tail cap;
a circuit board being electrically connected with the emission electrode;
a connecting member being made of insulating material and being in contact with the emission electrode;
a trigger being made of insulating material and being inserted into a recess of the connecting member;
a metal contact member having a cylinder and a through hole through which the trigger passes;
a first spring being sleeved on the cylinder of the metal contact member and electrically connecting to the circuit board;
a second spring being disposed in front of the first spring and electrically connecting to the circuit board;
whereby an erasing signal is generated by interactions between the metal contact member, the first spring, and the second spring caused by compression of the tail cap.

2. The capacitive stylus as recited in claim 1, wherein the emission electrode is spring-shaped and is sleeved on the connecting member, and the emission electrode comprises an end to electrically connect with the circuit board and provides a force to rebound the tail cap.

3. The capacitive stylus as recited in claim 1, wherein the eraser further comprises a shielding wire and a shielding ring made of metal, the shielding ring encompasses a portion of the emission electrode, and the shielding wire includes a first end electrically connected with a ground of the circuit board and a second end connected with the shielding ring.

4. The capacitive stylus as recited in claim 1, further comprising a tact switch disposed in front of the second spring, wherein the tact switch connects with a flexible printed circuit board, and a further compression of the tail cap will result in the trigger in contact with the tact switch.

5. The capacitive stylus as recited in claim 4, wherein the flexible printed circuit board electrically connects with a Bluetooth module, and when the tact switch is touched, the Bluetooth module emits a signal and the touch device receives the signal and executes an application.

6. The capacitive stylus as recited in claim 5, wherein the application comprises Microsoft Paint or Microsoft Notepad.

7. The capacitive stylus as recited in claim 5, further comprising a memory to store with a firmware for performing a program, wherein the program determines that the signal of the tact switch is ignored when the tail cap of the capacitive stylus approaches or contacts a screen of the touch device.

8. The capacitive stylus as recited in claim 1, wherein an end of the second spring electrically connects with a ground of the circuit board.

9. The capacitive stylus as recited in claim 1, wherein the pen housing further comprises a control circuit and a plurality of contacts electrically connecting with the control circuit, and the eraser further comprises a plurality of elastic shrapnels, and when the eraser is assembled with the pen housing, the plurality of elastic shrapnels are respectively in contact with the plurality of contacts.

10. The capacitive stylus as recited in claim 1, wherein the pen housing further comprises a battery or an electrode, and the front of the eraser comprises a contact electrode, and when the eraser is assembled with the pen housing, the contact electrode is in contact with the battery or the electrode.

\* \* \* \* \*